July 28, 1925.
C. PANCERO ET AL
SLAUGHTERHOUSE KNOCKING PEN
Filed Jan. 19, 1925
1,547,520
2 Sheets-Sheet 1
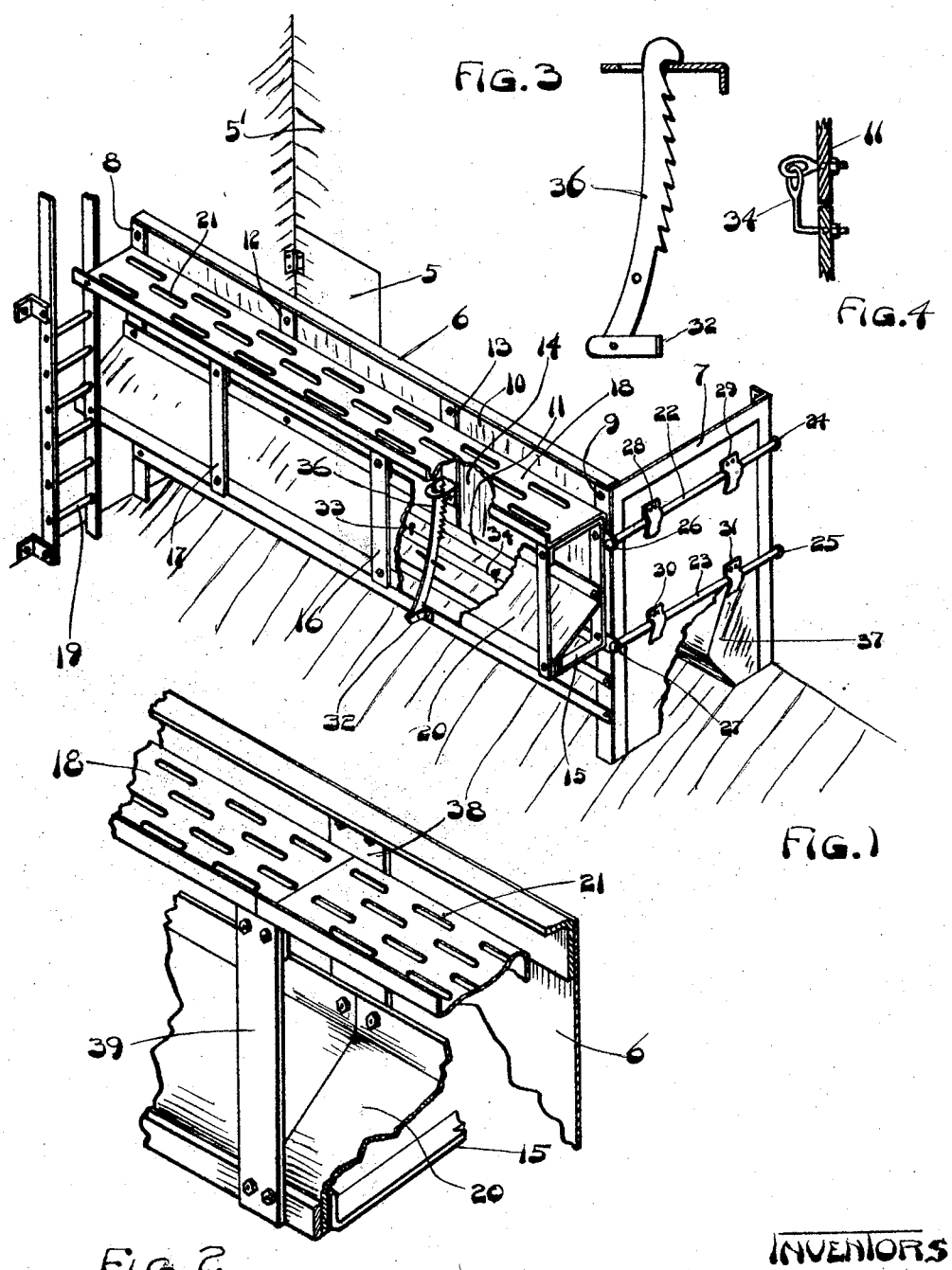

July 28, 1925.

C. PANCERO ET AL 1,547,520

SLAUGHTERHOUSE KNOCKING PEN

Filed Jan. 19, 1925

INVENTORS
Charles Pancero.
and
Jacob Freund

Patented July 28, 1925.

1,547,520

UNITED STATES PATENT OFFICE.

CHARLES PANCERO AND JACOB FREUND, OF CINCINNATI, OHIO.

SLAUGHTERHOUSE KNOCKING PEN.

Application filed January 19, 1925. Serial No. 3,533.

*To all whom it may concern:*

Be it known that we, CHARLES PANCERO and JACOB FREUND, both citizens of the United States, both residing at Cincinnati, in the county of Hamilton and State of Ohio, have invented new and useful Improvements in a Slaughterhouse Knocking Pen, of which the following is a specification.

This invention relates to a construction which is an improvement upon that which is covered in the Letters Patent granted to us on May 29, 1923, numbered 1,456,709, and entitled a Slaughterhouse construction. In the present invention an object has been to produce a knocking pen in which the provision is made for increased capacity by permitting of a sectional structure in which one or more of cattle or smaller animals may be handled without having to increase the size of the building in which the killing is done.

A further object is to produce a knocking pen in which animals of small as well as large size may be accommodated without having to provide pens of different sizes to accommodate animals of different sizes, and to use but a minimum of space in the killing process, as well as complying with modern sanitary methods.

These and other objects are attained in the knocking pen described in the following specification and illustrated in the accompanying drawings, in which:—

Fig. 1 is a perspective view of a single animal knocking pen embodying our invention.

Fig. 2 is a fragmental perspective view upon an enlarged scale, of the joint which is made in uniting adjacent sections of the pen when extension thereof is made for increased capacity.

Figs. 3 and 4 are detail views which will be explained in the following description of the invention.

Figure 5:
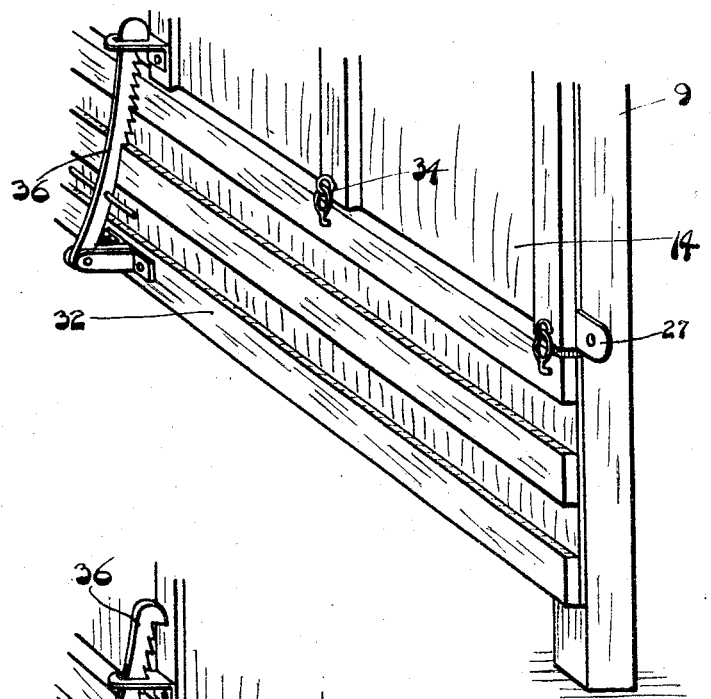
Figs. 5 and 6 are respectively views showing the closed and opened positions of a gate embodying a feature of the improvement herein described.
Figure 6:
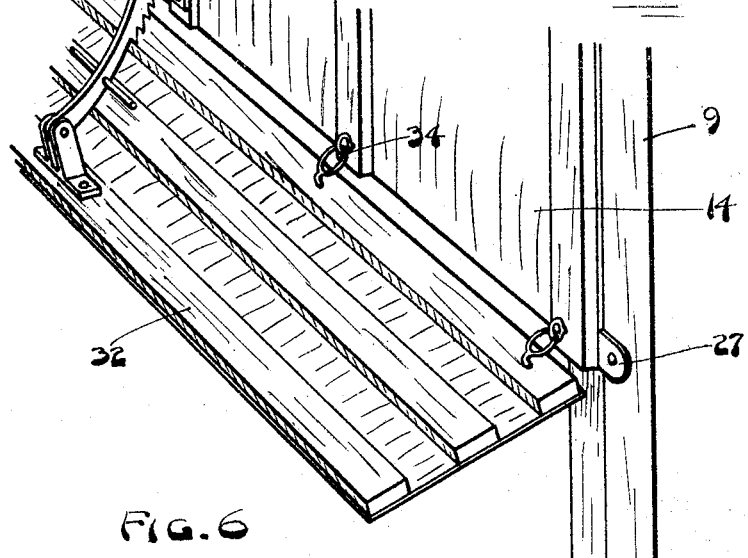

The pen is preferably located in a corner or along one side of the room in which the killing is to be done, as shown in Fig. 1, the enclosure thus formed being entered by the animals through a doorway 5 in the side wall of the room. One wall 6 of the pen is parallel with but spaced from the wall 5' sufficiently to permit of but a single file of animals to enter the pen. The end 7 of the pen is parallel with the opposite cooperating wall of the room. Pen wall 6 is of permanent construction, but end 7 is removable, as will be explained. Angle iron or wood posts 8 and 9 are set into the concrete floor of the room to support a top bar 10 which may be of structural iron or wood, as well as to support a lower bar 11 which is placed from the floor sufficiently to permit the passage beneath it of the carcass of largest sized animals to be killed. Intermediate supports 12 and 13 are provided so that the panel facings 14 of the side of the wall may be attached. Against the posts and supports are bolted the frames 15, 16, and 17 which support the walk 18 upon which the workman stands during the killing operation. This walk is reached by means of a ladder 19 secured to the cooperating wall of the room, as shown in Fig. 1. In order that the walk supporting frames 15, 16 and 17 may be sufficiently rigid, we have provided a sheet metal web 20 which is attached to the frames at its lower edge and is inclined upwardly to its upper edge which is attached to the posts 8 and 9 as well as the supports 12 and 13. Thus rigidity of the overhanging walk structure is secured, but an additional function is performed by causing the accumulated blood and slime which drops from the feet of the workmen, through the openings 21 of the walk 18, to be directed onto the more sloping portion of the sheet metal web, then onto the floor where it may be disposed of readily.

The end 7 of the pen is of solid panel construction as is the side 6, but is held in position by bolts 22 and 23 which enter ferrels 24 and 25 secured in the wall of the room, after passing through lugs 26 and 27 extending from post 9, hooks 28, 29, 30 and 31 being secured to the end panel for engagement over the bolts.

Thus the pen is complete for use when the larger sizes of animals are to be killed. However when the animals of relatively small size, such as sheep or hogs or calves, are to be killed, the opening beneath the paneled side of the pen is too large, which results frequently in escape of the animal into the room. In order to overcome this objection the open space is closed by gate 32 which is hung by hinges 33 and 34 from the side panel of the pen. This gate, 32 may be controlled so that it may be lifted somewhat by a ratchet device 36 in order to allow the body killed of either large or small animals to pass out beneath it. As in previously patented construction, there has been provided an inclined hump 37 against the side wall of the room in order that the carcass may be quickly slid out of the pen when the animal falls after it has been given the death blow.

Another provision of our invention will now be described. Should the volume of slaughtering to be done, increase beyond the capacity of the pen which has just been described, we have provided for an extension of the pen, by removing the end wall and adding to the side wall panel construction a duplicate thereof. This is accomplished by adding additional lengths of walk and web sections 18 and 20, after which the end wall may be placed at the end of the increased length pen. The joint in such an addition is shown in Fig. 2, in which the walk section 18 as well as the web sections 20 and the paneled wall sections are placed in abutting relation, with double width plates 38 and 39 to secure these sections together.

Having thus described our invention what we claim is:—

1. A slaughter house knocking pen comprising a side and end wall adapted to enclose a retangular space with two cooperating walls of a room in which killing is done, said side pen wall extending but a portion of the distance from the top to the bottom of the pen to leave a space beneath the wall of the pen through which the bodies of killed animals may pass, and a gate beneath the side wall hingedly mounted on the lower edges thereof and adapted to close the space beneath the side wall.

2. A slaughterhouse knocking pen comprising a side and end wall adapted to enclose a rectangular space with two cooperating walls of a room in which killing of animals is to be done, said end wall being removable, a side wall section adapted to be attached to the first mentioned side wall section after the end wall is removed, and adapted for attachment of the end wall to the end of the added side wall section whereby the length of the enclosed space of the pen will be that of the combined lengths of the side wall sections, walk sections adapted to be united to extend the length of the pen, and a sectional webbed walk support for attachment to the sectional side wall of the pen.

In witness whereof, we affix our signatures in the presence of four witnesses.

CHARLES PANCERO.

Witnesses:
CHARLES A. MEUSE,
MATHEW P. BEDEL.

JACOB FREUND.

Witnesses:
JOSEPH A. SULLIVAN,
MARK WILLIAMS.